United States Patent [19]

Meyers et al.

[11] 4,068,860
[45] Jan. 17, 1978

[54] TRAILER ANTI-JACKKNIFING APPARATUS

[76] Inventors: William G. Meyers, R.R. #1, Gretna, Nebr. 68028; Arthur A. Dirks, 5357 N. 47th St., Omaha, Nebr. 68104

[21] Appl. No.: 731,308

[22] Filed: Oct. 12, 1976

[51] Int. Cl.² ............................................. B62D 53/08
[52] U.S. Cl. .................................................. 280/432
[58] Field of Search ........................................ 280/432

[56] References Cited

U.S. PATENT DOCUMENTS

| 2,962,301 | 11/1960 | Leinbach | 280/432 |
| 3,837,678 | 9/1974 | Cicero | 280/432 |

*Primary Examiner*—Joseph F. Peters, Jr.
*Assistant Examiner*—R. Schrecengost
*Attorney, Agent, or Firm*—George R. Nimmer

[57] ABSTRACT

Anti-jackknifing apparatus for combination with conventional tractor-drawn trailers wherein the tractor includes a forward operator's cab and a rearward fifth wheel assembly having a skid-plate. The skid-plate conventionally includes a pair of longitudinally rearwardly extending guide-lugs having outward-sides and also inward-sides horizontally angularly converging toward an upright kingpin or other pivotal association with the trailer. The anti-jackknifing apparatus comprises a generally horizontal longitudinally extending ram terminating as a forward head-end, which ram and head-end has an inactive normal-station and also an anti-jackknifing extended-station respectively located rearwardly remote from and toward the skid-plate. A header is rigidly attached to the ram head-end and carries a pair of forwardly extending arms and preferably also a medial tongue which at ram forward extended-station abut an outward-side and an inward-side, respectively, of the guide-lugs to avert a potential jackknifing panic situation.

8 Claims, 5 Drawing Figures

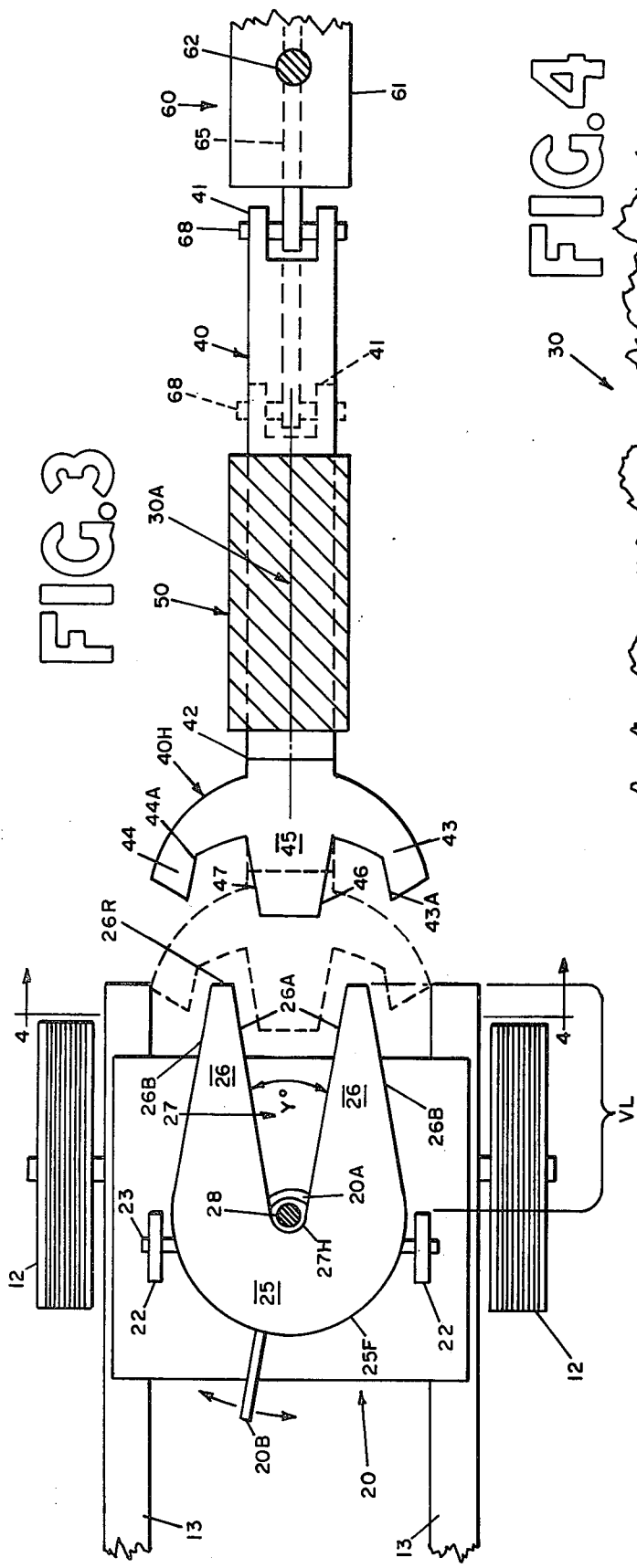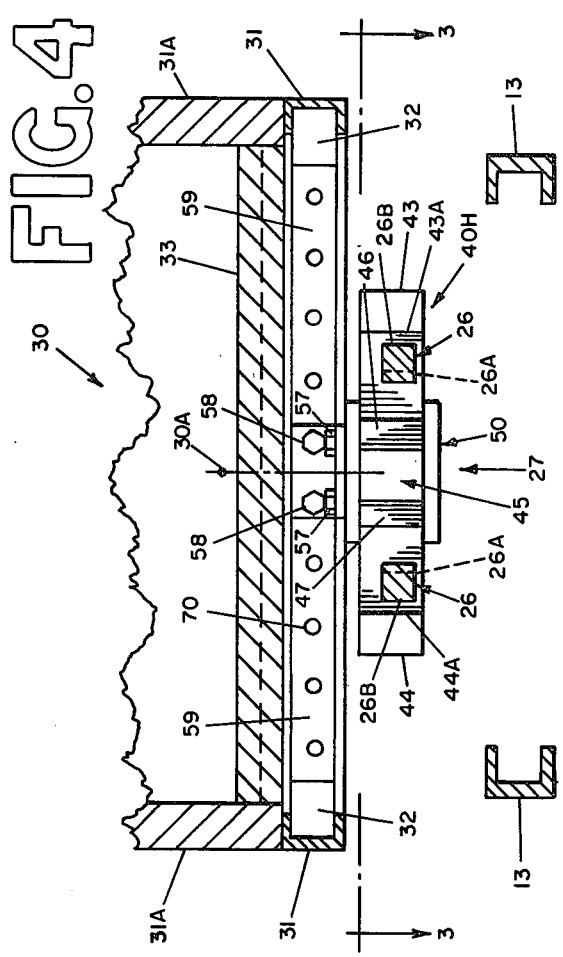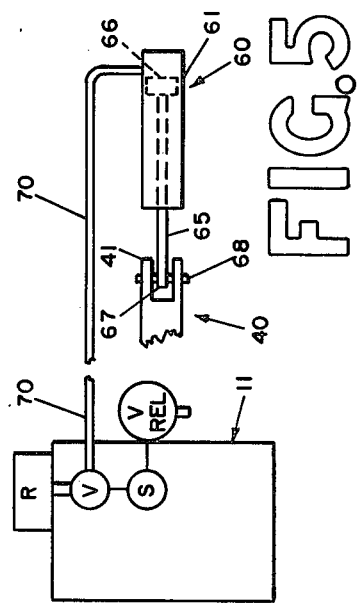

TRAILER ANTI-JACKKNIFING APPARATUS

Tractor-drawn trailers utilized in the overland trucking industry conventionally utilize an upright kingpin as the removable pivotal connection which defines the vertical pivot-axis between the tractor and trailer. Self-propelled overland tractors traditionally include a forwardly disposed operator's cab and also a rearwardly disposed fifth wheel assembly unit having a generally horizontal skid-plate tiltably mounted on a trunnion. The skid-plate part comprises a pair of longitudinally rearwardly extending guide-lugs having outward-sides and also having rearwardly divergent inward-sides terminating at transversely opposed rear-tips to provide a V-slot forwardly converging from the rear-tips to an upright kingpin extending integrally downwardly from the trailer. The tractor fifth wheel assembly also includes a latching arrangement for a removable pivotal connection between the tractor and trailer and with such freedom about the vertical pivot-axis that the tractor-drawn trailer vehicle is able to negotiate sharp corner turns.

In the overland trucking industry, the "jacknifed" condition describes the inadvertent gross misalignment of the longitudinally extending trailer about its vertical pivot-axis connection. Various roadway and operational situations can cause "jackknifing" of the forwardly moving tractor/trailer combination. The jackknife condition frequently leads to a disastrous loss of control which is a hazardous problem when the vehicular roadway is slick from rain or ice. Prior art workers have attempted to develop jackknife prevention means which are intended to be controllably actuated by the tractor operator from the cab portion in panic situations i.e. whenever his application of the vehicle brakes causes the trailer to pivot too rapidly about the vertical pivot-axis. For example, in such panic situations, the trailer must be prevented from pivoting more than about 5°–15° about the pivot-axis lest the momentum of the swerving trailer becomes practically unstoppable to slam broadside against the tractor operator's cab. Accordingly, prior art workers have recognized the necessity for a trailer anti-jackknifing resistance means that becomes effective substantially within the 5°–15° range and controllably actuatable from within the tractor cab by the vehicle operator. However, prior art anti-jackknifing apparatus tend to be unreliable or expensive for one reason or another, or more appropriate to original equipment form rather than as readily installable addendum accessory for existing tractor-drawn trailer vehicles.

It is accordingly the general objective of the present invention to provide improved jackknifing resistance apparatus for tractor-drawn trailer vehicles and which is exceedingly sturdy and reliable, yet of relatively inexpensive construction that is admirably suited for use as a readily installable addendum accessory for numerous models and styles of existing overland vehicles.

Among the relevant prior art in this field is U.S. Pat. No. 3,972,542, issued on Aug. 3, 1976, to the applicants of the present application.

With the above and other objects and advantages in view, which will become more apparent as this description proceeds, the trailer anti-jackknifing apparatus of the present invention generally comprises: a generally horizontal longitudinally extending ram forwardly terminating as a head-end, which ram head-end has a rearward inactive normal-station and a forward-anti-jackknifing extended-station, the ram rigidly extending from the trailer underside and being actuatably reciprocatable between its two stations and remotely controllable from within the operator's cab, there being a header rigidly attached to the ram head-end and comprising a pair of rigid arms adapted at ram extended-station to abuttably engage an outward-side of the skid-plate guide-lugs to avert a potential jackknifing situation, and the header also preferably including a rigid tapered tongue to simultaneously abuttably engage an inward-side of the skid-plate guide-lugs.

In the drawing, wherein like characters refer to like parts in the several views, and in which:

FIG. 3 is a sectional plan view (looking downwardly) taken along lines 3—3 of FIGS. 2 and 4.

FIG. 4 is a sectional elevational view (looking rearwardly) taken along lines 4—4 of FIGS. 2 and 3.

FIG. 5 is a schematic view directed toward a remotely controlled actuation means for the reciprocating ram and header combination of the present invention.

Figure 1:
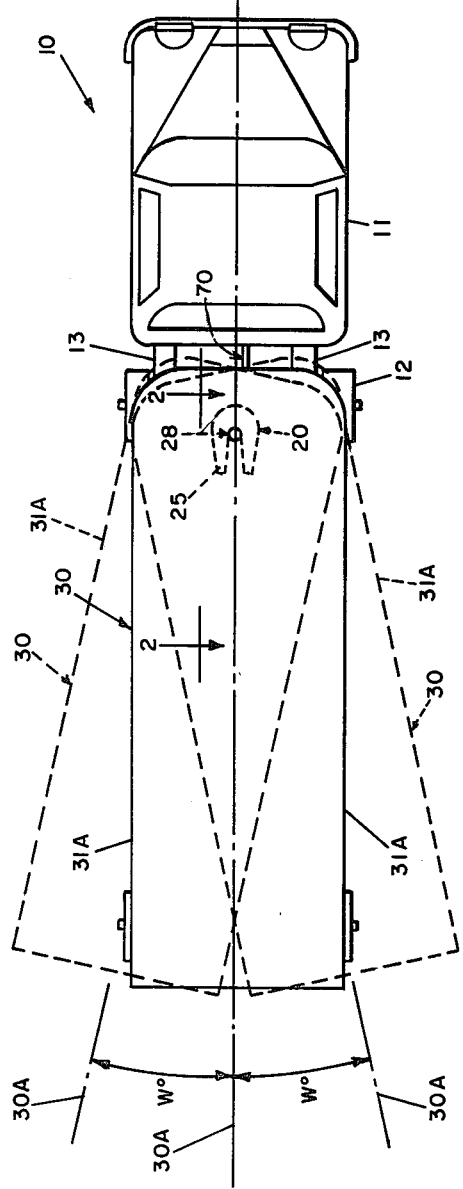
FIG. 1 is a top view of a typical tractor-drawn trailer vehicular combination having a representative embodiment of the anti-jackknifing apparatus of the invention herein (apparatus obscured in FIG. 1 by the overlying trailer).
Figure 2:
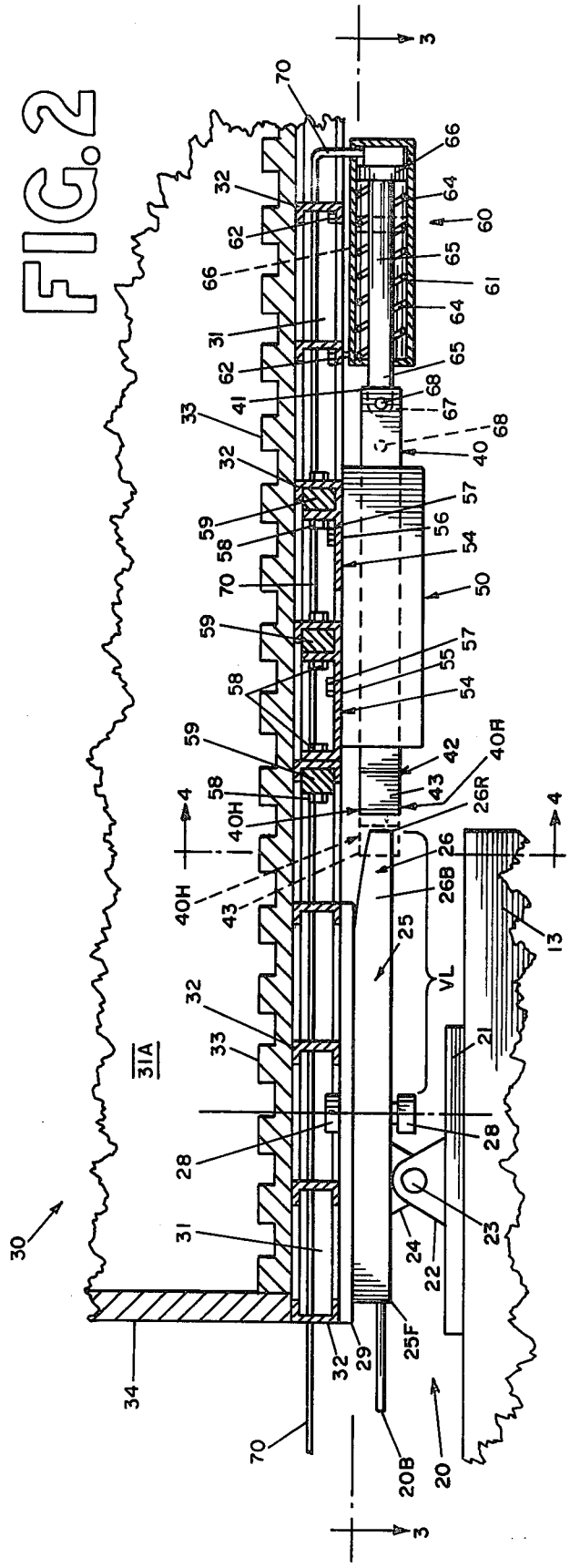
FIG. 2 is a sectional elevational view taken through line 2—2 of FIG. 1.

Referring now to the drawings, FIG. 1 designates a top plan view of a self-propelled tractor 10 removably pivotably attached along a vertical pivot-axis (as through kingpin 28) to a longitudinally rearwardly extending trailer 30. Conventional tractor 10 includes a forwardly disposed operator's cab 11 and a set of rear drive wheels 12 which support the rear end of a tractor chassis composed of a pair of longitudinal horizontal beams 13. Mounted on the chassis 13 between the rear drive wheels 12 is a fifth wheel assembly unit (designated generally as 20) for removably coupling tractor 10 to trailer 29-30 via kingpin 28. The underlying base means for the trailer typically comprises several interconnected channel-irons including a pair of longitudinal-irons 31 and a plurality of transverse-irons 32. Horizontal decking 33 rests upon the tranverse-irons 32 and provides an internal floor for trailer 30, which trailer also has upright walls including a transversely extending front-wall 34 and a pair of longitudinally extending side-walls 31A. The trailer 30 has on its frontal (34) underside and (attached to the transverse-irons 32) the usual sturdy horizontal base-plate 29, which rests upon the fifth wheel unit 20 (at skid-plate 25). Herein, trailer 30 has a kingpin coupling 28 which projects rigidly downwardly from trailer underlying base-plate 29 and into fifth wheel assembly 20 for removably pivotably connecting the front of tractor-drawn trailer 30.

The fifth wheel assembly 20 includes a horizontal rest-plate 21 which rests upon and is attached to the longitudinal chassis beams 13 generally between the tractor rear wheels 12. At its sides, rest-plate 21 has integrally attached thereto a pair of upright trunnion-brackets 22 receiving and confining the ends of a horizontal trunnion-shaft 23 which extends between them. Trunnion-shaft 23 in turn serves as a journal for a pair of triangular side-brackets 24 integrally depending from skid-plate 25. The skid-plate 25 part of assembly 20 possesses the conventional sturdy one-piece metallic construction which typically includes a generally circular forward major portion 25F and a bifurcate rearward portion as a pair of longitudinally rearwardly extending guide-lugs 26. The respective guide-lugs 26 have outward-sides 26B and also have rearwardly diverging inward-sides 26A terminating at transversely opposed rear-tips 26R to provide a V-slot 27 forwardly converging for a longitudinal-length "VL" from the rear-tips 26R to kingpin 28. The skid-plate V-slot portion 27 forward terminus typically takes the form of a circular hole 27H sized slightly larger than kingpin 28. Removable pivotal connection between the depending vertical-axial kingpin (28) component of trailer assembly 29-30 and fifth wheel assembly 20 is normally effected through a latch-lug 20A which is manually engageable and disengageable about kingpin 28 with hand-lever 20B that forwardly underlies skid-plate 25.

Thus, removable pivotal connection between the fifth wheel assembly 20 of tractor 10 and trailer kingpin 28 allows the trailer 30 to pivot in both directions of the tractor-to-trailer vertical pivot-axis (e.g. at 28). For example, FIG. 1 solid line indicates the trailer longitudinal central-axis 30A extending along a vertical-plane collinear with tractor 10, phantom lines indicating the trailer 30 pivotal conditions about kingpin 28. In certain panic situations, evidencing potential jackknifing as indicated in FIG. 1 phantom lines, the trailer central-axis 30A should not be allowed to deviate more than W° about kingpin pivot-axis 28, the numerical value of W° being typically within the range of 5° to 15°, and substantially some 10°. Within these angular values, disastrous jackknifing situations might ordinarily be avoided.

It is the general purpose of the present invention to provide anti-jackknifing means for combination with tractor-trailer type vehicles whereby the trailer central-axis 30A is not allowed to deviate more than an arbitrarily prescribed W° angular value with respect to the pivot-axis (e.g. kingpin 28). The W° angular value of about 5° to 15° is consistent with manageable trailer momentums during swerving. As will be hereinafter pointed out in greater detail, the anti-jackknifing apparatus comprises a generally horizontal longitudinally extending elongate ram (40) terminating as a forward head-end 42, which ram head-end 42 has an inactive rearward normal-station and also a forward anti-jackknifing extended-station at skid-plate 25. Ram 40 is remotely controllably actuatable from the tractor operator's cab 11 and at extended-station the ram (40) is necessarily rigidly and non-pivotably irresistably associated with the trailer underside.

For the ram 40 illustrated the reciprocation path is longitudinally horizontally lineal and directionally forwardly from a rearward normal-station (solid line) to the anti-jackknifing extended-station located at skid-plate 25 (phantom line). The ram embodiment 40 depicted takes the form of a sturdy monolithic lineal metallic bar having a clevis tail-end 41 and a forward head-end at which header 40H is rigidly attached. For most skid-plates (25) the V-slot 27 is defined by lineal planar upright inward-sides 26A, and the skid-plate outward-sides 26B are normally upright and linealy planar.

There is a rigidly stationary slideway which allows the ram (40) to reciprocate between inactive-station and extended-station and which provides a rigid non-pivoting connection to the trailer for the ram at extended-station. The slideway embodiment 50 surrounds a substantial length portion of ram 40, slidway 50 being located wholly rearwardly of the head-end 42 at normal-station and wholly forwardly of tail-end 41 at extended-station. Rigid and non-pivotal connection of the collar-like slideway 50 to the trailer underside is herein effected with mult-perforate rectangularly cross-sectioned horizontal bars conforming to the internal side of channel-irons 32 and affixed thereto with horizontal bolts 58. Completing herein a sturdy and non-pivotal utility connection between slideway 50 and the trailer underside (30-32) is a pair of sturdy angular brackets including an L-shaped bracket 56 and a longitudinally elongated U-shaped bracket 55 which brackets are attached to the irons 32 and through transverse bars 59 with said bolts 58. The respective brackets 55 and 56 have a plurality of spaced vertical holes 54 for passage of upright bolts 57 to permit selection of the distance between collar 50 and skid-plate 25. Depending upon the jackknife stopping leverage needed between skid-plate 25-26 and the header 40H, the distance of the stationary slideway 50 relative to kingpin 28 can be empiracally selected.

There are actuation means for causing the ram (40) and the header (40H) to reciprocate between normal-station and extended-station. The actuation means comprises: a powering means attached to the trailer for powerably reciprocating the ram; and a remote control means at the tractor operator's cab for remotely controlling the powering means. The powering means might be aptly selected such as air-powered, hydraulic-powered, electric-powered, etc. For the horizontally longitudinally reciprocatable linear ram 40, an air-powered piston 60 is employed. Piston 60 conventionally comprises: a cylindrical casing 61 which is rigidly stationarily attached (as with bolts 62) to the trailer underside channel-irons 32. Piston 60 also includes a longitudinally reciprocatable horizontal plunger 65 having an enlarged rearward circular shoulder 66 slidably associated within casing 61 and a fore-end 67 which is attached to the ram (40) as by pin 68. There are suitable rearward retraction means to maintain plunger fore-end 67 at normal-station. For example, a helical spring 64 within casing 61 and surrounding plunger 65 might be used.

Typical control means herein comprises an elongate airline 70 leading from source "R" of compressed-air, thence through on-off valve "V", and finally communicating within piston casing 61 to the rear of plunger shoulder 66. There is also a pressure-relief valve "V.REL", which along with the valve "V" are controlled with switch "S" by the operator/driver from within the tractor cab 11. Thus, whenever the tractor operator senses a panic situation wherein the trailer (30) begins to swerve about the pivot-axis (28), he actuates switch "S" to allow the compressed-air to move plunger 65 forwardly. Plunger 65 moves ram 40 longitudinally forwardly whereby co-movable header 40H assumes extended-station located abuttably against the skid-plate guide-lugs 26. Inasmuch as collar slideway 50 is rigidly and non-pivotably attached to the trailer 30, also co-rigid is ram 40 and header 40H, and continued swerving and jackknifing of trailer 30 is precluded. Upon such averting of jackknifing, the operator/driver through switch "S" vents the compressed-air at "V.REL." and ram 40 and header 40H reassume normal-station (e.g. by spring 64) where they remain during ensuing roadway travel (until re-activated when another panic situation warrants).

The header (40H) is necessarily a very sturdy member (preferably singularly constructed of heavy metal) and is rigidly securely attached (as by welding) to ram head-end 42 and directly co-reciprocatable with ram 40. The header shown comprises a central horizontal tongue 45 which is colineal with ram 40 and axis 30A. Tongue 45 desireably comprises a pair of upright planar faces 46 and 47 forwardly converging at a taper equal in angular value to the skid-plate V-slot 27. Preferably, the tongue forward extremity at ram extended-station is located between kingpin 28 and guide-lugs rear-tips 26R whereby a single face only contacts the skid-plate (at 26A) thereby averting a potential jackknifing situation while yet coincidentally allowing the operator/driver to exert partial turning control of tractor 10.

Although the header tongue alone in abutment against an upright inward-side of a skid-plate guide-lug (26) will avert potential trailer jackknifing, the high abutment force upon the skid-plate inward-side 26A can cause deformation or cleavage (from kingpin 28 to forward-part 25F) for relatively light-weights skid-plates (25). To prevent skid-plate deformation or cleavage by tongue 45 at 26A, header arms (43, 44) abuttable against an outward-side (26B) of the guide-lugs (26) are admirably suited. Moreover, the header arms might by themselves i.e. without the necessity for a tongue (45), analagously avert a potential jackknifing situation by abutment against an outward-side 26B. The combined use of arms and tongue results in unusual effectiveness, however. The forwardly extending and co-elevational horizontal header arms, herein as leftward arm 43 and rightward arm 44, diverge outwardly away from the ram head-end 42. The header inside contour at the arms includes uprightly planar portions (e.g. 43A-left, 44A-right) for abutment with the guide-lugs outward-sides (26B). Preferably, the skid-plate 25 and the header 40H are geometrically symmetrical, header 40H generally resembling tri-dent configuration in plan view. The header arms, and tongue, as well as the skid-plate guide-lugs, are co-elevational under actuation for abutment at the skid-plate 25. The necessarily sturdy header (40H) is desirably singularly constructed of metal. Preferably, the header arms, and tongue, at ram forward extended-station are longitudinally positioned between the kingpin 28 and the guide-lugs rear-tips 26R. In such spatial relationship at extended-station, as has already been alluded to with respect to tongue faces 46 and 47, a single arm abuts a single guide-lug, the other arm being away from its adjacent guide-lug, thereby averting a potential jacknife while yet allowing the driver/operator to exert partial turning control of tractor 10.

From the foregoing, the construction and operation of the trailer anti-jackknifing apparatus will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. Trailer anti-jackknifing apparatus in combination with a conventional tractor-drawn trailer wherein the tractor includes a forward operator's cab and a rearward skid-plate comprising a generally circular forward portion and a pair of longitudinally horizontally rearwardly extending guide-lugs having rearwardly divergent upright inward-sides terminating at transversely opposed rear-tips to provide an elongate V-slot forwardly converging for a longitudinal finite-length from the rear-tips to a secureable kingpin at the tractor-to-trailer vertical pivot-axis, the outside contour of the skid-plate being geometrically symmetrical and having an upright outward-side, the trailer longitudinally extending underside carrying a depending kingpin, said anti-jackknifing apparatus comprising:

A. a generally horizontal longitudinally extending elongate ram terminating as a forward head-end, said ram being located beneath the trailer underside and attached to the trailer rearwardly of the kingpin, said ram head-end having an inactive normal-station and an anti-jackknifing extended-station respectively located rearwardly most remote from and nearer to the skid-plate, said ram at extended-station being rigidly and non-pivotably associated with the trailer;

B. a sturdy header rigidly attached to and co-reciprocatable with the ram head-end, said header including a pair of co-elevational forwardly extending horizontal arms which diverge outwardly away from the ram head-end and also a forwardly extending horizontal tongue having a pair of upright faces disposed between said arms, the inside contour of the header being geometrically symmetrical with respect to the trailer longitudinal-axis whereby at ram extended-station at least one of the header arms and also a tongue upright face during trailer swerving about the kingpin are adapted to simultaneously engage an outward side and an inward side of the skid-plate guide-lug, and C. actuation means for causing the ram and its rigidly attached forward header to reciprocate between normal-station and extended-station, the ram actuation means including control means located within the tractor operator's cab and hence forwardly remote from the skid-plate.

2. The apparatus of claim 1 wherein the skid-plate V-slot is angular as provided by lineal inward-sides for the guide-lugs; wherein the header tongue comprises a pair of upright planar faces forwardly converging at a taper value equal in augular value to the skid-plate V-slot; and wherein both arms and tongue for the header are at common elevation and singularly constructed of metal.

3. The apparatus of claim 2 wherein the guide-lugs outward-sides are uprightly planar; and wherein the header inside contour at the arms includes uprightly planar portions for abutment with the guide-lugs outward-sides.

4. The apparatus of claim 3 wherein the header arms and tongue at ram forward extended-station are longitudinally positioned between the kingpin and the guide-lugs rear-tips whereby abutment contact exists between a single inward-side of the skid-plate and with a single face of the tapered tongue and simultaneously between a single outward-side of the skid-plate and a single header arm.

5. The apparatus of claim 1 wherein the herder is of symmetrical tri-dent configuration as seen in the top plan view thereof.

6. The apparatus of claim 1 wherein the ram is forwardly linearly extendible in horizontal longitudinal path from rearward normal-station to forward extended-station; said ram including a rearward tail-end; and wherein the actuation means includes powering means attached to the ram and located rearwardly of the ram tail-end, said powering means being located below and attached to the trailer underside.

7. The apparatus of claim 6 wherein a stationary slideway surrounds the ram and is non-pivotably rigidly attached to the trailer underside, said slideway being located rearwardly of the ram head-end when at rearward inactive normal-station.

8. The apparatus of claim 7 wherein the powering means is of the fluid-actuated piston type including a casing portion stationarily attached to the trailer and a longitudinally forwardly extendable horizontal plunger which is co-reciprocatably attached to the ram.

* * * * *